T. B. ASHFORD.
Grazing-Post.
No. 223,872. Patented Jan. 27, 1880.
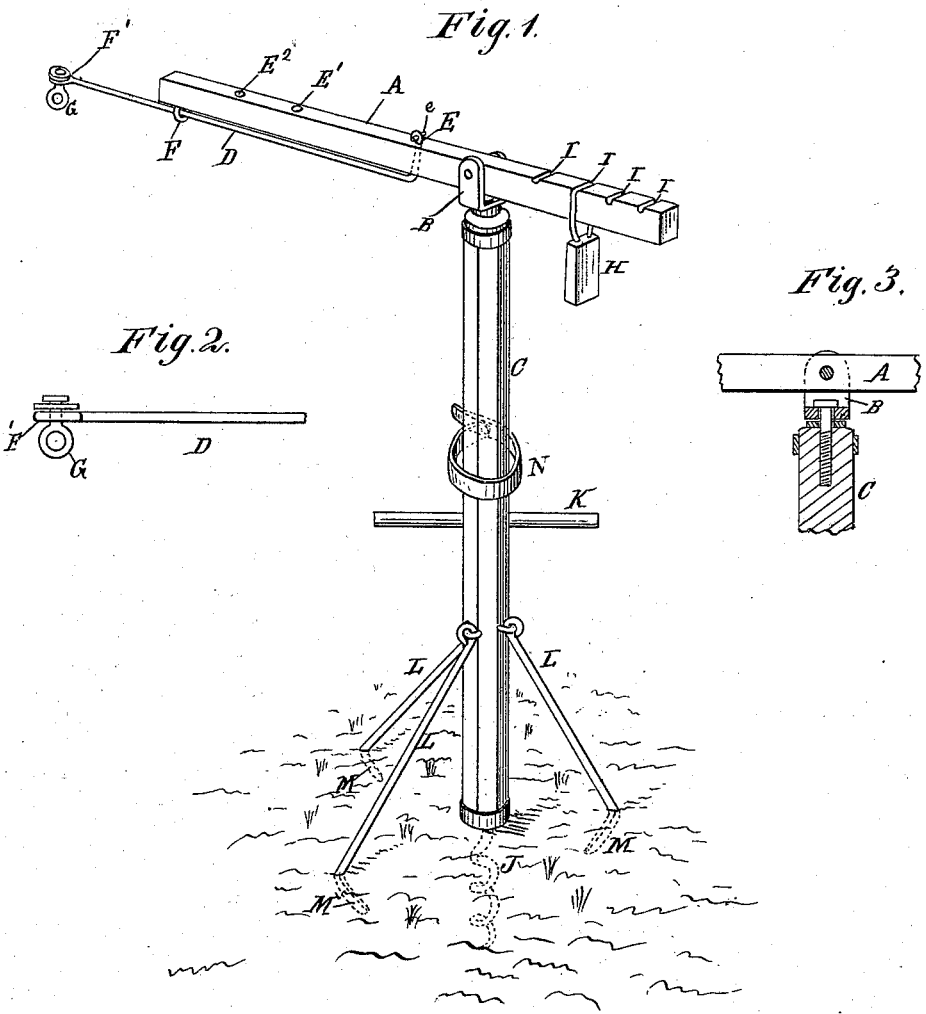

UNITED STATES PATENT OFFICE.

THOMAS B. ASHFORD, OF CLINTON, NORTH CAROLINA, ASSIGNOR TO JOHN ASHFORD, OF SAME PLACE.

GRAZING-POST.

SPECIFICATION forming part of Letters Patent No. 223,872, dated January 27, 1880.

Application filed November 25, 1879.

*To all whom it may concern:*

Be it known that I, THOMAS B. ASHFORD, of Clinton, in the county of Sampson and State of North Carolina, have invented a new and Improved Grazing-Post, of which the following is a specification.

The object of my invention is to provide a new and improved grazing-post for stock, which will prevent twisting of the halter, and which can be easily secured and adjusted.

The invention consists in a balanced lever, to which the halter is attached, pivoted to the top of a post, provided with a screw at the lower end for screwing it into the earth, and braced by a number of hook-bars, which are driven into the earth to give it greater rigidity.

In the accompanying drawings, Figure 1 is a perspective view of my improved grazing-post. Fig. 2 is a detail view of the end of the rod to which the halter is attached. Fig. 3 is a detail sectional view of the top of the post.

Similar letters of reference indicate corresponding parts.

A represents a lever, held in the forked pivot B, pivoted to the top of the post C. A rod, D, bent at right angles at one end, passes through the aperture E in the lever A, is held by a spring-pin, $e$, and is supported at the end of the lever by a ring, F, through which it passes. The rod D can be adjusted to greater or less length beyond the end of the lever by passing the bent end through the aperture E' or E² in the lever A. The other end of the rod D is provided with an eye, F', in which a ring or hook, G, is fastened in such a manner that it can rotate.

The lever is balanced by a weight, H, which is hung in one of the notches I I I in the lever. The lever may be balanced in any other suitable manner.

A screw, J, is attached to the lower end of the post C, and is screwed into the ground by means of the handle or cross-rod K.

Two or more bracing-rods, L L, terminating in the hooks M M, are pivoted to the post a small distance below the center.

The operation is as follows: The post is rotated by means of the handle K until the screw J has firmly taken in the ground. As the brace-rods L L would be inconvenient to the person rotating the post, they are laid up against the post and are held by the strap N, which passes around them; but as soon as the screw is in the ground they are loosened, and are then driven into the ground, as shown. The halter is then attached to the ring G, and the lever counterbalanced by the weight H.

The animal can walk in a circle without winding up the halter, for the lever A turns with it, and it cannot wind the halter around the rod D, for the hook G rotates in the eye F'.

This improved post can be fastened in smooth or rough ground, cannot be drawn out by the animal, and enables the animal to reach all the grass within certain limits.

Having thus described my invention, I claim as new and desire to secure by Letters Patent—

1. The combination of the rod D and ring G with the lever A, provided with apertures E E' E², substantially as shown and described, for the purpose specified.

2. The combination of the grazing-post C and the brace-rods L, terminating in hooks M M, substantially as shown and described, for the purpose specified.

THOMAS BUTLER ASHFORD.

Witnesses:
G. H. MOSELEY,
JOHN ASHFORD.